United States Patent Office 3,023,193
Patented Feb. 27, 1962

3,023,193
SOLUBLE POLYUREAS AND PROCESS FOR PRODUCING THE SAME
Wilhelm Thoma, Leichlingen, and Otto Bayer and Heinrich Rinke, Leverkusen, Germany, assignors to Farbenfabriken Bayer Aktiengesellschaft, Leverkusen, Germany, a corporation of Germany
No Drawing. Filed Apr. 1, 1958, Ser. No. 725,485
Claims priority, application Germany Apr. 6, 1957
11 Claims. (Cl. 260—77.5)

Our copending application Serial No. 660,769, filed May 22, 1957, now U.S. Patent 2,988,538 is related to new soluble polyureas, more especially to polyureas which are soluble in water or in alkaline liquids. These polyureas have recurring units of the formula

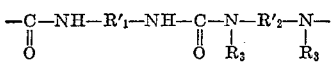

in which $R'_1$ represents an organic, aliphatic, cycloaliphatic or aromatic residue, $R'_2$ represents an organic, aliphatic, cycloaliphatic, aromatic, araliphatic or heterocyclic residue containing one or more acid groups, and $R_3$ represents hydrogen or an alkyl group.

The present application is a continuation in part of our above application Serial No. 660,769 and is related to another process for producing soluble polyureas, which new process allows for the production of polyureas having recurring units of the formula

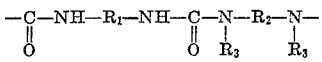

in which $R_1$, $R_2$ and $R_3$ have the same meaning as before provided that either $R_1$ or $R_2$ contains at least one acid group. The present process, therefore, is useful for producing a greater variety of soluble polyureas than the process of our above application Serial No. 660,769.

It is well known to produce high molecular weight compounds having a plurality of urea linkings by reacting diisocyanates with diamines or by reacting diamines with phosgene. Instead of reacting diisocyanates with diamines, diphenyl carbamic acid esters have been reacted with diamines while splitting off phenol. These polymers are soluble in certain organic solvents but insoluble in inorganic media.

It has also been known to produce polyureas soluble in alkalis by reacting phosgene with diamines having sulfonic acid radicals in their molecule. Such a procedure leads to high molecular weight compounds having a great many —$SO_3H$ groups in the chain, which fact is undesired for many purposes since these compounds have a trend to gelation. They, furthermore, are strictly linear compounds.

It is, therefore, a primary object of the present invention to provide a new class of high molecular weight compounds having a plurality of urea groups. Another object of the present invention is to provide new polyureas which are water-soluble and alkali-soluble and which do not show the disadvantages of prior art. A further object of the invention is to provide a process for the production of polyureas which are water-soluble and alkali-soluble. Still further objects will appear hereinafter.

These objects are accomplished in accordance with the present invention by reacting phenyl carbamic acid esters of diamino sulphonic, diamino phosphoric or diamino carboxylic acids (which esters may be substituted) with organic primary or secondary diamines which, if desired, can contain additional acid groups in the molecule.

By means of the process of this invention, it is possible to obtain new water-soluble or alkali-soluble polyureas just as if one had postulated a theoretical reaction between a diamine and a non-existent diisocyanate-sulfonic acid, diisocyanate-phosphoric acid, or diisocyanate-carboxylic acid. In other words, the phenyl carbamic acid esters of diamino sulfonic, diamino phosphoric, or diamino carboxylic acids here employed will react with any desired organic primary or secondary diamine just as one might theorize that an acid-substituted diisocyanate would react with a diamine.

The reaction proceeds in accordance with the following general diagram:

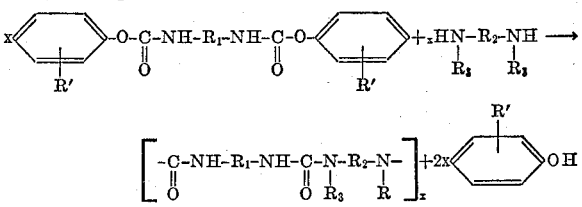

in which $R_1$ represents an organic radical containing at least one acid group, $R_2$ represents an organic radical and $R_3$ represents hydrogen or an alkyl group. Each $R'$ can be hydrogen or, for example, one or more alkyl, halogen, nitro or alkoxy groups.

Among the large number of (possibly substituted) phenyl carbamic acid esters of aromatic and aliphatic diamino sulphonic acids, diamino carboxylic acids and diamino phosphoric acids which are suitable for use in the process of the invention, the following are to be mentioned as examples: bis-phenyl carbamic acid esters of 4,4'-diamino-dibenzyl-2,2'-disulphonic acid, or 4,4'-diamino-stilbene-2,2'-disulphonic acid, of benzidine-2,2'-disulphonic acid, of benzidine-3,3'-disulphonic acid, of 1,3-diamino-benzene-4-sulphonic acid, of 1,4-diamino-benzene-3-sulphonic acid, of 2,6-diaminotoluene-4-sulphonic acid, of 4,4'-diamino-3,3'-dimethoxydiphenyl-6,6'-disulphonic acid, of 1,5-naphthylene diamine-3,7-disulphonic acid, of 1,3-diaminopropane-2-sulphonic acid, of 1,6-hexamethylene diamine sulphonic acid, of 3,5-diaminobenzoic acid, of 3,6-diaminobenzoic acid, of 2,4-diaminocinnamic acid, of 2,5-diaminophenoxyacetic acid, of $dl$-lysine, of $dl$-ornithine, of $\alpha,\delta$-diaminoadipic acid, or of 1,5-diamino-3-methylpentane-2,4-dicarboxylic acid.

It is also possible to use those phenyl carbamic acid esters of diamino acids which are obtained by reaction of amino sulphonic acids (for example aminocaproic acid) or of aminocarboxylic acids (for example taurine) with 2 mols of acrylonitrile, and subsequent hydrogenation. It is also possible to use those phenyl carbamic acid esters which are obtained from diamino sulphonic acids obtainable by reacting diamines with 2 mols of a sulphone. In addition, diaminocarboxylic acids which are obtained from diamines and halogen fatty acids can be used, in the form of their phenyl carbamic acid esters, in the reaction according to the invention.

Mixtures of diphenyl carbamic acid esters of diamino sulphonic acid, diamino carboxylic acid and diamino phosphoric acid are also suitable starting materials for the process of the invention, and it is of course also possible to use concurrently the phenyl carbamic acid esters which do not carry any further carboxyl or sulphonic acid groups. Examples are for instance the phenyl carbamic acid esters of hexamethylene diamine, p-phenylene diamine, and 2.4-toluylene diamine. The concurrent use of substances splitting off trifunctional or other polyfunctional isocyanates is also possible and these substances can likewise comprise acid groups. The triphenyl carbamic acid ester of 4,4',4''-triphenyl methane triamine may be mentioned as an example. The joint use of sulphonic acid, carboxylic acid and phosphoric acid starting materials and the concurrent use of trifunctional components or components of higher function render possible a delicate control of the synthesis and thus also of the solubility and other physical properties of the salts of the polyurea-sulphonic acids.

Suitable diamines for carrying out the present process are, inter alia, aliphatic, cycloaliphatic, aromatic, araliphatic and heterocyclic primary or secondary diamines. The following diamines are to be mentioned by way of example: hydrazine, ethylene diamine, 1.3-propylene diamine, 1.4-butylene diamine, 1,6-hexamethylene diamine, N,N'-dimethylene diamine or N,N'-dimethyl-hexamethylene diamine. The carbon chain in the diamines can be interrupted by hetero atoms, and examples of such diamines are γ,γ'-diaminopropyl ether, γ,γ'-diaminopropyl glycol ether, γ,γ'-diaminopropyl butylene ether, γ,γ'-diaminopropyl methylamine, dipropylene triamine and spermine. Araliphatic diamines, for example 1.3-bis-(aminomethyl)-benzene, and also cycloaliphatic diamines, such as for example 4,4'-diamino dicyclohexyl methane and 4,4'-diamino-cyclohexane are also suitable. Heterocyclic diamines, for example piperazine or γ,γ'-diaminopropyl piperazine, can also be used in the process of the invention.

The aromatic amines suitable for the process can be the same as already mentioned above in connection with the carbamic acid esters derived therefrom, but, of course, without the acidic substitution. If desired, it is also possible for diamines with acid groups to be preferably used together with the amines being free of acidic substitution in the present process, such as, for instance, 1.3-diaminobenzene-4-sulphonic acid,
1.4-diaminobenzene-3-sulphonic acid,
2.6-diaminotoluene-4-sulphonic acid,
4,4'-diaminostilbene-2,2'-disulphonic acid,
4,4'-diamino-dibenzyl-2,2'-disulphonic acid,
Benzidene-2,2'-disulphonic acid,
Benzidene-3,3'-disulphonic acid,
4,4'-diamino-3,3'-dimethoxy-diphenyl-6,6'-disulphonic acid,
4,4'-diamino-2-methyl azobenzene-2'-sulphonic acid,
4,4-diamino diphenyl urea disulphonic acid,
4,4'-diamino diphenylamine-2-sulphonic acid,
2.6-diaminophenol-3-sulphonic acid,
$4^1,4^2$-diamino triphenyl methane-$2^3,4^3$-disulphonic acid,
2.4-diamino cinnamic acid,
2.5-diamino phenoxy acetic acid,
3.5-diamino benzoic acid,
3.6-diamino benzoic acid,
3.5-diamino benzene-1-carbamide taurine, diamino acids obtained by adding 2 mols of acrylonitrile to glycol or taurine and subsequent hydrogenation, 1.6-hexamethylene diamino-N,N'-diacetic acid, and also diamino sulphonic acids which are formed by condensation of several components with formation of amide, urethane, urea or ester, such as, for example, 1.8-bis-(3'-aminobenzamide)-naphthalene-3.6-disulphonic acid.

Quite generally trifunctional or other polyfunctional amines can also be employed concurrently.

One particular advantage of the process according to the invention is that water-soluble or alkali-soluble polyureas which could not hitherto be prepared owing to the absence of the requisite diisocyanates are now made available.

The following polyurea-sulphonic acid salts are to be mentioned as examples for this purpose; the reaction product of the diphenyl carbamic acid ester of 4,4'-diaminodibenzyl-2,2'-disulphonic acid (as the sodium salt) and γ,γ'-diaminopropylmethylamine.

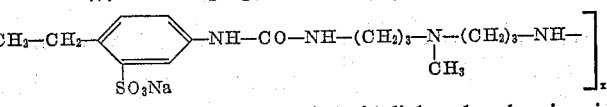

or the reaction product of the said diphenyl carbamic acid ester and γ,γ'-diaminopropyl-piperazine.

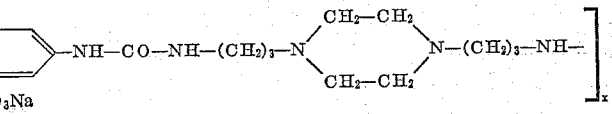

or the polyurea of the said diphenyl carbamic acid ester and γ,γ'-diaminopropyl butylene ether

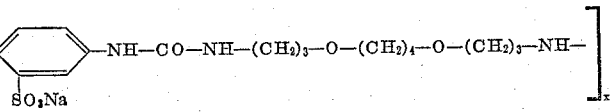

The reaction of the aforesaid components generally takes place in suitable solvents, for example water or a lower aliphatic alcohol, and if necessary also in dimethyl formamide or formamide or mixtures of the last-mentioned two solvents with water and/or alcohols.

Generally speaking, high polymer products can be produced at temperatures in the region of 0° C. while other combinations have to be reacted at higher temperatures, e.g. up to 150° C. The reaction with aliphatic diamines can already be carried out at 20° C. or lower. Temperatures between 20 and 100° C. are preferred in any case. It is advisable in many cases for alkali in the form of carbonates or hydroxides to be added to the condensation mixtures. The quantity of alkali added should not exceed the quantity required to fix the phenol which is split off.

When carrying out the reaction, the diphenyl carbamic acid ester, for example in aqueous alcoholic solution, can be introduced into the diamine solution, or vice versa. Both components can also be placed in the aforementioned solvents and heated together.

Although in most cases it is necessary to have a molar exchange between the diphenyl carbamic acid esters and the diamines, it has been shown in other cases that products of high molecular weight can be obtained with diphenyl carbamic acid esters in a proportion considerably lower than the molar proportion. Again, in many cases it can also be advisable to use the diphenyl carbamic acid ester in excess.

The separation of the (possibly substituted) phenol which is liberated in the reaction can be carried out in various ways. For example, the reaction mixture can be slightly acidified with dilute mineral acids or dilute organic acids and the phenol driven off by means of steam. It is, however, also possible to separate the phenol if carbon dioxide is introduced into the neutral or slightly alkaline reaction mixture and if steam is blown in simultaneously or subsequently.

The polyurea-sulphonic acid salts can also be freed from phenol if, during the course of their isolation as a solid substance, the reaction mixtures, more or less concentrated by distillation, preferably in vacuo, are dehydrated with lower alcohols or lower ketones (for example methanol, isopropanol, acetone, methylethyl ketone).

The polymers of the invention have a molecular weight ranging from about 1,000 to about 50,000. In contrast to the prior art method, the number of acid groups present in one high molecular weight molecule can be predetermined by choosing the proper starting materials, for instance by using a diamine of low molecular weight together with a diphenyl carbamic acid ester of higher molecular weight or vice versa. The polymers obtainable in accordance with the aforementioned data, when used for example as sodium salts in water and even in concentrations lower than 1%, usually produce highly viscous solutions, even in small concentrations, which solutions have many similarities with colloidal systems such as starch or gelatine solutions. In many cases the water solubility can be considerably increased by adding small amounts of formamide or dimethyl formamide. Generally speaking, a sufficient water solubility is obtained when the fraction of a high molecular weight molecule to be brought into solution by one acid group does not exceed the molecular weight of 400–500. This limit can, however, be safely exceeded if other hydrophilic groups (for example hydroxyl or ether groups) are present in addition to the acid group.

The solution viscosity of the polyurea-carboxylic or polyurea-sulphonic acid salts is dependent on pH value. They show the smallest value in the alkali range (pH=10), but they rise very strongly through the neutral range to the acid range. In the weakly acid range (pH about 3–6), the solutions are optically clear and free from swelling agents, and it is only with strong acidification that precipitation occurs.

The absolute viscosity values of the 1% aqueous solution are 50–100 cp. (in neutral solutions).

The products of the present invention are believed to be not strictly linear since some NCO groups may react with the urea groups formed in the course of the reaction. Products of particularly high molecular weight can also be obtained by concurrently using relatively small amounts of trifunctional or polyfunctional starting materials. The amounts necessary for this purpose must, however, be used in carefully controlled quantities in order to avoid complete cross-linking of the polymer which would render the product insoluble.

The novel polyurea acids which are water-soluble and alkali-soluble but insoluble in most of the common organic solvents (soluble, however, for instance, in formamide) are capable of being used for many purposes. Inter alia they can be readily used for antistatic fittings of textiles owing to their hydrophilic properties. Furthermore, foils or films can be cast which are insoluble in common organic solvents such as acetone. Another application for the products of the invention is to facilitate the deposit of heavy metals at the electrodes in electrolytical processes. The products are also particularly valuable in the pharmaceutical field.

The following examples illustrate the process of the invention in greater detail.

*Example 1*

2.35 g. of hexane diamine are placed in 50 ml. of water. A solution of 14.2 g. of the sodium salt of 4,4'-bis-phenyl carbamic acid ester dibenzyl-2,2'-disulphonic acid in 150 ml. of methanol and 75 ml. of water is added dropwise over a period of 30 minutes at 20° C. while stirring. Stirring is continued for 4 hours at room temperature. After distilling off the solvent in vacuo, a jelly is obtained which is dehydrated with alcohol. The polyurea sulphonic salt is formed as a white powder in a yield of 80%. The relative viscosity of a 1% neutral aqueous solution is $\eta_{rel}=3.08$; K=78.

*Example 2*

2.0 g. of hexane diamine are placed in 50 ml. of water. The solution referred to in Example 1 and comprising the sodium salt of 4,4'-bis phenyl carbamic acid ester dibenzyl-2,2'-disulphonic acid is added dropwise at 50° and the further procedure is as set forth in Example 1. The polyurea sulphonic acid salt is formed in a substantially quantitative yield. $\eta_{rel}=2.05$ (1% neutral aqueous solution); K=60.5.

*Example 3*

114.2 g. of the sodium salt of 4,4'-bis-phenyl carbamic acid dibenzyl-2,2'-disulphonic acid are placed in 150 ml. of methanol and 75 ml. of water. A solution of 3.0 g. of hexane diamine in 50 ml. of water is added dropwise at 20° C. and stirring is continued for another 4 hours at 20° C. Working up is carried out as in Example 1. The polyurea sulphonic acid salt shows a viscosity of 46.2 cp., in a 1% aqueous solution (neutral solution), this viscosity being however only 1.58 cp. in slightly alkaline solution (0.2 cc. of N/1-caustic soda solution/10 cc.=0.02 N-caustic soda solution) and 121.5 cp. in weakly acid solution (0.02 N-hydrochloric acid). The same substance, as a 0.1% aqueous solution (neutral) has a relative viscosity $\eta_{rel}=1.515$.

*Example 4*

3.0 g. of hexane diamine and 1.1 g. of anhydrous soda are placed in 20 ml. of water. The solution of bisphenyl carbamic acid ester described in Example 1 is added dropwise at 20° C. The procedure adopted is as set out in Example 1. The polyurea-sulphonic acid salt has a K value of 145 in 1% neutral aqueous solution, this value being 47.4 in 0.02 N-caustic soda solution.

*Example 5*

3.0 g. of hexane diamine and 14.2 g. of the bis-phenyl carbamic acid ester used in Example 1 are heated for 30 minutes to 100° C. with 100 ml. of water. 10 ml. of N-soda solution are then added and the mixture is kept for another 30 minutes at 95–100° C. The viscous solution is acidified with 30 ml. of N-hydrochloric acid. Steam is blown through to separate the phenol split off. The solution is thereafter made neutral with respect to phenolphthalein and concentrated to 100 ml. It shows a viscosity of 1110 cp.

*Example 6*

1.25 g. of hydrazine hydrate are heated with 14.2 g. of the bis-phenyl carbamic acid ester used in Example 1 in 100 ml. of water for 4 hours at 50° C. The clear solution is concentrated in vacuo and the resin obtained is dehydrated with alcohol. The sodium salt dissolves in water to give a viscous solution.

*Example 7*

18 ml. of ethylene diamine solution (0.81 g./ml.) and 14.2 g. of the bis-phenyl carbamic acid ester used in Example 1 are heated to 95° C. for 30 minutes in 100 ml. of water. 10 ml. of N-caustic soda solution are then added and heating is continued for another 30 minutes at 95–100° C. On cooling, a gelatinous mass which can be dehydrated with alcohol to provide the powdery polyurea sulphonic acid salt, is obtained. Yield: 94% $\eta_{rel}=1.24$.

*Example 8*

2.1 g. of tetramethylene diamine are placed in 25 ml. of water. A bis-phenyl carbamic acid ester solution described in Example 1 is added dropwise at 50° C. over a period of 30 minutes and while stirring. Stirring is continued for another 2 hours at 50° C., the substance is concentrated in vacuo and the slimy mass is dehydrated with alcohol. The yield of dry polyurea sulphonic acid salt is 93% of the theoretical. $\eta_{rel}=2.21$ (1% neutral aqueous solution); K=64.

*Example 9*

5.2 g. of γ,γ'-diaminodipropyl butylene ether are placed in 20 ml. of water. The bis-phenyl carbamic acid ester solution described in Example 1 is added dropwise over a period of 30 minutes at 20° C. After stirring for another 4 hours at 20° C., the clear solution is concentrated in vacuo. The resin obtained is dehydrated with acetone. The yield is substantially quantitative. The sodium salt yields a viscous solution.

Example 10

5.47 g. of dl-lysine dihydrochloride are dissolved in 75 ml of N-caustic soda solution. The bis-phenyl carbamic acid ester solution described in Example 1 is added dropwise at 20° C. and the mixture is stirred for 4 hours. Working up is effected by concentration in vacuo folowed by dehydration of the resin formed with alcohol. The polyurea sulphone-carboxylic acid precipitates as sticky threads from the aqueous solution on being acidified with mineral acid.

Example 11

3.8 g. of γ,γ'-diaminodipropyl methylamine are placed in 20 ml. of water. The bis-phenyl carbamic acid ester solution described in Example 1 is added dropwise at room temperature while stirring. After working up as described in Example 10, an amphoteric polyurea sulphonic acid salt which is soluble in water to give a viscous solution is obtained. Yield: 90%.

Example 12

2.9 g. of dipropylene triamine are placed in 20 ml. of water. The bis-phenyl carbamic acid ester solution described in Example 1 is added dropwise at 40° C. and the mixture is stirred for 2 hours at 40° C. Working up is carried out as in Example 11. The amphoteric polyurea-sulphonic acid salt which is obtained is readily available for further reactions on the secondary nitrogen atom.

Example 13

5.0 g. of 4,4'-diaminodicyclohexyl methane are placed in 50 ml. of water, and the bis-phenyl carbamic acid ester solution described in Example 1 is added dropwise at 50° C. 5.0 ml. of N-caustic soda solution are then added and the mixture is heated for 30 minutes at 95–100° C. This is then concentrated in vacuo and the gel dehydrated with alcohol. Yield: 90.5%. The viscosity of a 1% aqueous neutral solution is 25 cp.

Example 14

3.3 g. of bis-(aminomethyl)-benzene-1,3 are placed in 20 ml. of water. The bis phenyl carbamic acid ester solution described in Example 1 is added at 50° C. and the mixture is stirred for 2 hours. After concentration in vacuo, the crude polyurea is dehydrated with alcohol. Yield 94%.

Example 15

5.0 g. of γ,γ'-diaminodipropyl piperazine are placed in 20 ml. of water. The bis-phenyl carbamic acid ester solution referred to in Example 1 is added dropwise at 20° C. and the mixture is stirred for 4 hours at room temperature. After concentrating the solution in vacuo, the slimy mass is dehydrated with alcohol. Dilute solutions of the amphteric polyurea are already highly viscous. $\eta_{rel}=2.90$, K=76 (1% neutral aqueous solution).

Example 16

2.40 g. of hexane diamine are heated for 30 minutes to 95–100° C. with 9.6 g. of bis-phenyl carbamic acid ester of the sodium salt of 1,3-bis-(aminomethyl)-benzene sulphonic acid in 80 ml. of water. 20 ml. of N-caustic soda solution are then added and the mixture heated for another 30 minutes at 95–100° C. The highly viscous solution which is formed is dehydrated with alcohol.

Example 17

3.0 g. of hexane diamine are placed in 50 ml. of water. A solution of the ammonium salt of 4,4'-bis-phenyl carbamic acid ester diphenyl-2,2'-disulphonic acid in 35 ml. of methanol is added dropwise at 50° C. and the mixture is stirred for 3 hours at 50° C. The solution is concentrated in vacuo and the resin which remains is dehydrated with alcohol. The ammonium salt of polyurea-sulphonic acid yields viscous aqueous solutions.

Example 18

13.8 g. of the sodium salt of 4,4'-bis-phenyl carbamic acid phenyl ester stilbene-2,2'-disulphonic acid and 8.3 g. of the sodium salt of 4,4'-diaminostilbene-2,2'-disulphonic acid are heated to boiling point for 6 hours in 150 ml. of water. A pH value below 7 is maintained by adding 10% soda solution. The viscous solution is concentrated in vacuo and the polyurea-sulphonic acid salt is dehydrated with acetone. The yield is substantially quantitative.

Example 19

3.0 g. of hexane diamine are placed in 15 ml. of dimethyl formamide. A solution of 14.2 g. of the sodium salt of 4,4'-bis-phenyl carbamic acid phenyl ester dibenzyl-2,2'-disulphonic acid in 85 ml. of dimethyl formamide is added dropwise over a period of 15 minutes at 80° C. After stirring for another 3 hours at 80° C., the reaction mixture is freed in vacuo from the larger part of the dimethyl formamide. The resin is dehydrated with methanol. The polyurea-sulphonic acid salt shows a relative viscosity of $\eta_{rel}=1.30$ in 1% neutral aqueous solution and the K value=33.6.

Example 20

3.04 g. of 3,5-diaminobenzoic acid and 14.2 g. of bis-phenylcarbamic acid ester according to Example 1 are heated in 20 ml. of caustic soda solution and 130 ml. of water for 8 hours at 75° C. After 6 hours, 10% soda is added twice. The solution is concentrated in vacuo, dehydrated with alcohol and an 89% yield of the polyurea-sulphone-carboxylic acid salt is obtained.

Example 21

4.9 g. of 4,4'-diamino-3,3'-dimethoxy diphenyl are dissolved in 50 ml. of water and a solution of 14.2 g. of the bis-phenyl carbamic acid ester used in Example 1 in 175 ml. of methanol and 25 ml. of water is added dropwise over a period of 10 minutes at boiling temperature. The reaction solution is kept at boiling point for 4 hours and during this time the pH value is adjusted to approximately 8 by means of 10% soda. After concentrating the solution in vacuo, the polyurea-sulphonic acid salt is dehydrated with alcohol: Yield: 75.5%.

Example 22

11.6 g. of hexamethylene diamine are dissolved in 60 ml. of water. At room temperature a solution of 68.4 g. of the sodium salt of 4,4'-bis-p-tolyl carbamic acid ester dibenzyl-2,2'-disulphonic acid in 600 ml. of methanol and 300 ml. of water is added dropwise. The reaction solution is kept stirring for 4 hours and then worked up according to Example 10. The product thus obtained is soluble in water to give a highly viscous liquid.

What is claimed is:

1. A process for producing soluble polymers which comprises reacting a bis-phenyl carbamate, each of the carbamyl nitrogens having attached thereto one hydrogen, and containing at least one acid group selected from sulfonic, carboxylic and phosphoric acid groups, with a diamine having at least one hydrogen atom on each amino group; the reaction being conducted at a temperature of from 0° C. up to about 150° C., wherein both the phenyl carbamate groups of the ester, and the two amino groups of the diamine reactant, are separated from each other by a divalent aromatic radical.

2. A process for producing soluble polymers which comprises reacting, in the presence of an inert organic solvent, a bis-phenyl carbamate, each of the carbamyl nitrogens having attached thereto one hydrogen, and containing at least one acid group selected from sulfonic, carboxylic and phosphoric acid groups, with a diamine having at least one hydrogen atom on each amino group, the reaction being conducted at a temperature of from 0° C. up to about 150° C., wherein both the phenyl carbamate groups of the ester, and the two amino groups of the diamine reactant, are separated from each other by a divalent aromatic radical.

3. A process for producing soluble polymers which comprises reacting in an aqueous phase a bis-phenyl carbamate, each of the carbamyl nitrogens having attached thereto one hydrogen, and containing at least one acid group selected from sulfonic, carboxylic and phosphoric acid groups, with a diamine having at least one hydrogen atom on each amino group, the reaction being conducted at a temperature of from 0° C. up to about 150° C., wherein both the phenyl carbamate groups of the ester, and the two amino groups of the diamine reactant, are separated from each other by a divalent aromatic radical.

4. The process of claim 1 wherein said bis-phenyl carbamic acid ester and said diamine are used in about equimolecular proportions.

5. The process of claim 1 wherein said diamine contains at least one acid group in the molecule.

6. The process of claim 1 wherein in addition to said diamine and said ester, a third compound reactive therewith is employed in the reaction, said third compound containing more than two reactive groups selected from the class consisting of amino and two bis-phenyl carbamic acid ester groups, the amount of said third compound being controlled so as to avoid complete cross-linking of the polymer.

7. A water-soluble polyurea consisting essentially of recurring structural units of the formula:

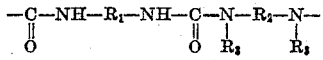

wherein $R_1$ and $R_2$ represent an organic radical, one of these radicals containing at least one acid group and the other radical containing a different acid group, the acid group being selected from the class consisting of sulfonic, carboxylic and phosphoric, and $R_3$ is a member selected from the group consisting of hydrogen and alkyl, $R_1$ being selected from the group consisting of an aromatic hydrocarbon radical, an aliphatic hydrocarbon radical, and a phenoxy-aliphatic hydrocarbon radical; $R_2$ being selected from the group consisting of aliphatic hydrocarbon, cycloaliphatic hydrocarbon, aromatic hydrocarbon, and araliphatic hydrocarbon.

8. A water-soluble polyurea consisting essentially of recurring structural units of the formula

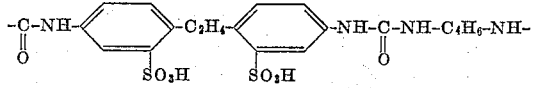

9. A water-soluble polyurea consisting essentially of recurring structural units of the formula

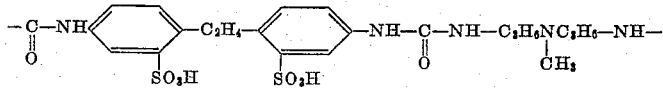

10. A water-soluble polyurea consisting essentially of recurring structural units of the formula

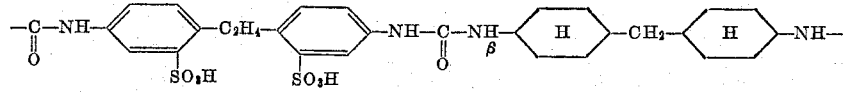

11. A water-soluble polyurea consisting essentially of recurring structural units of the formula

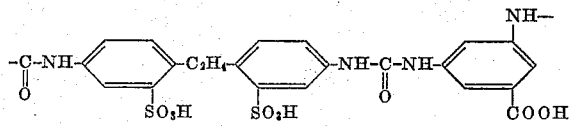

References Cited in the file of this patent

UNITED STATES PATENTS

| | | |
|---|---|---|
| 2,181,663 | Martin | Nov. 28, 1939 |
| 2,502,548 | Allen et al. | Apr. 4, 1950 |
| 2,820,024 | Kerk | Jan. 14, 1958 |
| 2,833,744 | Neher | May 6, 1958 |